(12) United States Patent
Prathapan et al.

(10) Patent No.: US 10,901,692 B2
(45) Date of Patent: Jan. 26, 2021

(54) BITONIC SORTING ACCELERATOR

(71) Applicant: TEXAS INSTRUMENTS INCORPORATED, Dallas, TX (US)

(72) Inventors: Indu Prathapan, Bangalore (IN); Puneet Sabbarwal, Bangalore (IN); Pankaj Gupta, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 16/237,447

(22) Filed: Dec. 31, 2018

(65) Prior Publication Data

US 2020/0019374 A1 Jan. 16, 2020

(30) Foreign Application Priority Data

Jul. 12, 2018 (IN) .............................. 201841026064

(51) Int. Cl.
*G06F 7/24* (2006.01)
*G06F 5/06* (2006.01)

(52) U.S. Cl.
CPC .............. *G06F 7/24* (2013.01); *G06F 5/065* (2013.01); *G06F 2207/228* (2013.01)

(58) Field of Classification Search
CPC ................................... G06F 7/24; G06F 5/065
USPC ....................................................... 708/671
See application file for complete search history.

(56) References Cited

U.S. PATENT DOCUMENTS

| 4,567,572 | A | | 1/1986 | Morris et al. | |
|---|---|---|---|---|---|
| 5,179,717 | A | * | 1/1993 | Sato | G06F 7/24 |
| 5,206,947 | A | * | 4/1993 | Edem | G06F 7/24 |
| 6,035,296 | A | * | 3/2000 | Fushimi | G06F 7/24 |
| 6,088,353 | A | | 7/2000 | Even | |
| 2016/0196940 | A1 | | 7/2016 | Becker et al. | |
| 2016/0283549 | A1 | | 9/2016 | Hux | |
| 2018/0349096 | A1 | * | 12/2018 | Redfern | G06F 7/36 |

OTHER PUBLICATIONS

International Search Report and Written Opinion dated Oct. 31, 2019, PCT Application No. PCT/US2019/041315, 9 pages.

* cited by examiner

*Primary Examiner* — Tan V Mai
(74) *Attorney, Agent, or Firm* — Brian D. Graham; Charles A. Brill; Frank D. Cimino (57) ABSTRACT

An accelerator for bitonic sorting includes a plurality of compare-exchange circuits and a first-in, first-out (FIFO) buffer associated with each of the compare-exchange circuits. An output of each FIFO buffer is a FIFO value. The compare-exchange circuits are configured to, in a first mode, store a previous value from a previous compare-exchange circuit or a memory to its associated FIFO buffer and pass a FIFO value from its associated FIFO buffer to a subsequent compare-exchange circuit or the memory; in a second mode, compare the previous value to the FIFO value, store the greater value to its associated FIFO buffer, and pass the lesser value to the subsequent compare-exchange circuit or the memory; and in a third mode, compare the previous value to the FIFO value, store the lesser value to its associated FIFO buffer, and pass the greater value to the subsequent compare-exchange circuit or the memory.

20 Claims, 7 Drawing Sheets

BITONIC SORTING ACCELERATOR

CROSS-REFERENCE TO RELATED APPLICATIONS

The present application claims priority to Indian Provisional Patent Application No. 201841026064, which was filed Jul. 12, 2018, is titled "HARDWARE IMPLEMENTATION OF BITONIC SORTING USING MODIFIED RSDF ARCHITECTURE," and is hereby incorporated herein by reference in its entirety.

SUMMARY

In accordance with at least one example of the disclosure, a hardware accelerator for bitonic sorting includes a plurality of compare-exchange circuits and a first-in, first-out (FIFO) buffer associated with each of the compare-exchange circuits. An output of each FIFO buffer is a FIFO data value. The compare-exchange circuits are configured to, in a first mode of operation, store a previous data value from a previous compare-exchange circuit or a memory to its associated FIFO buffer and pass a FIFO data value from its associated FIFO buffer to a subsequent compare-exchange circuit or the memory; in a second mode of operation, compare the previous data value to the FIFO data value, store the greater of the data values to its associated FIFO buffer, and pass the lesser of the data values to the subsequent compare-exchange circuit or the memory; and in a third mode of operation, compare the previous data value to the FIFO data value, store the lesser of the data values to its associated FIFO buffer, and pass the greater of the data values to the subsequent compare-exchange circuit or the memory.

In accordance with another example of the disclosure, a hardware accelerator for bitonic sorting includes four multiplexers (muxes) each including an output and a first input configured to couple to a memory. The hardware accelerator also includes a four-input compare-exchange circuit having four inputs and four outputs, where the output of each mux is coupled to one of the inputs of the four-input compare-exchange circuit. The hardware accelerator further includes four bitonic sorting accelerators including a first bitonic sorting accelerator, a second bitonic sorting accelerator, a third bitonic sorting accelerator, and a fourth bitonic sorting accelerator. Each of four bitonic sorting accelerators has an input and an output, and each output of the four-input compare-exchange circuit is coupled to one of the bitonic sorting accelerator inputs. The output of each bitonic sorting accelerator is coupled to a second input of one of the muxes.

In accordance with another example of the disclosure, a method for bitonic sorting includes, for each of a plurality of compare-exchange circuits, receiving a control signal and operating in one of a first mode of operation, a second mode of operation, and a third mode of operation in response to the control signal. In the first mode of operation, the method further includes storing, by the compare-exchange circuit, a previous data value from a previous compare-exchange circuit or a memory to an associated FIFO buffer, wherein an output of the associated FIFO buffer is a FIFO data value; and passing a FIFO data value from the associated FIFO buffer to a subsequent compare-exchange circuit or the memory. In the second mode of operation, the method further includes comparing, by the compare-exchange circuit, the previous data value to the FIFO data value; storing the greater of the data values to the associated FIFO buffer; and passing the lesser of the data values to the subsequent compare-exchange circuit or the memory. In the third mode of operation, the method further includes comparing, by the compare-exchange circuit, the previous data value to the FIFO data value; storing the lesser of the data values to the associated FIFO buffer; and passing the greater of the data values to the subsequent compare-exchange circuit or the memory.

BRIEF DESCRIPTION OF THE DRAWINGS

For a detailed description of various examples, reference will now be made to the accompanying drawings in which.

DETAILED DESCRIPTION

Sorting operations are frequently used by various algorithms, such as for signal processing, radar tracking, image processing, and others. Sorting operations are often implemented using software executed by a central processing unit (CPU) or a graphics processing unit (GPU), which is computationally intensive and thus reduces the ability of the CPU or GPU to perform other tasks. Hardware accelerators are employed to perform certain mathematical operations, such as sorting, more efficiently than software executed on a general-purpose host processor such as a CPU or GPU. However, improvements to sorting speed and circuit area are desirable.

In accordance with the disclosed examples, a hardware accelerator for bitonic sorting (a bitonic sorting accelerator) and a method for bitonic sorting provide a hardware solution to sort an array of data values with improved sorting speed and reduced circuit area. The bitonic sorting accelerator of the present disclosure performs bitonic sorting more efficiently then software executed by a host processor, for example. In particular, the bitonic sorting accelerator of the present disclosure leverages a structure similar to a Radix-2 single delay feedback (R2SDF) architecture to perform bitonic sorting of an array of data values in a pipelined fashion. The bitonic sorting accelerator sorts N binary numbers fed serially into the accelerator in a total of $(N*\log_2 N)$ clock cycles, which is equal to the theoretical upper bound for sorting speed achievable with any comparison-based sorting algorithm. In some examples, the throughput of the bitonic sorting accelerator is further improved by four times by increasing the parallelism of the hardware accelerator.

A bitonic sequence is a sequence of elements ($a_0$, $a_1$, ..., $a_{N-1}$) that satisfies either of two conditions. The first condition is that there exists an index i, $0 \leq i \leq N-1$, such that $(a_0, \ldots, a_i)$ is monotonically increasing and $(a_{i+1}, \ldots, a_{N-1})$ is monotonically decreasing. The second condition is that there is a cyclic shift of indices so that the first condition is satisfied. For example, {1, 4, 6, 8, 3, 2} (which monotonically increases and then monotonically decreases), {6, 9, 4, 2, 3, 5} (for which a cyclic shift produces a sequence that monotonically increases and then monotonically decreases (beginning with {2}) or monotonically decreases and then monotonically increases (beginning with {9}), and {9, 8, 3, 2, 4, 6} (which monotonically decreases and then monotonically increases) are bitonic sequences.

In examples of the present disclosure, a hardware accelerator sorts a bitonic sequence of size N through the recursive application of compare-exchange (CE) operations to the elements of the bitonic sequence. The hardware accelerator enables input data of size N to be sorted in a total of ($N*\log_2 N$) clock cycles, which is equal to the theoretical upper bound for any comparison-based sorting algorithm, while reusing portions of a R2SDF architecture. A CE operation compares two elements and then optionally exchanges or swaps the position of the two elements depending on which element has a greater value. For example, if the CE operation seeks to place the largest element in the second position, then the CE operation compares a first value and a second value and, if the first value is greater than the second value, exchanges the two elements. However, if the second value is greater than the first value, then no exchange occurs.

Figure 1:
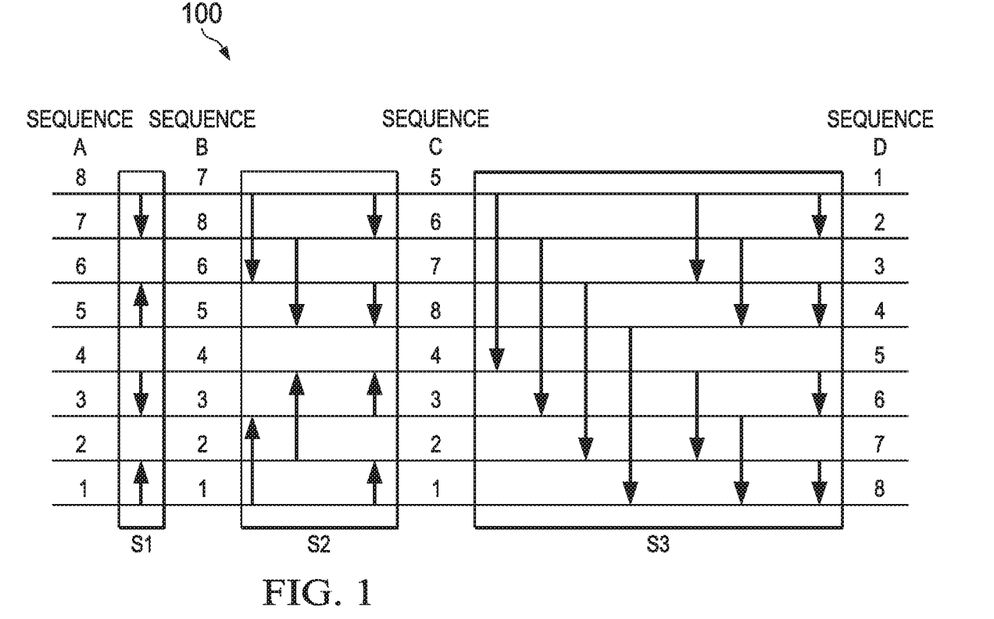
FIG. 1 shows a signal flow graph of a bitonic sorting network in accordance with various examples.

FIG. 1 shows an example signal flow graph of a bitonic sorting network 100 for sorting a data sequence of size N=8 with random inputs. In general, the input data is an N-element vector of data values. In the signal flow graph 100, the arrows indicate the two elements being compared (the elements located at the "head" and "tail" of each arrow) and the direction in which the elements are exchanged or swapped. In the example of FIG. 1, the smaller of the two elements being compared is located at the tail of the arrow after the comparison. The bitonic sorting network 100 first rearranges an unsorted data sequence (Seq. A) into a bitonic sequence (Seq. C), which occurs in the first $\log_2 N-1$ stages, in this case stages S1 and S2. Subsequently, the bitonic sorting network 100 rearranges the bitonic sequence (Seq. C) into a sorted sequence (Seq. D) in the last stage S3.

The input data, or the unsorted data sequence (Seq. A), is treated as a combination of bitonic sequences of length 2. In stage S1, parallel CE operations are applied in opposite directions for adjacent bitonic sequences (pairs) as notated by adjacent arrows facing in opposite directions. The result of stage S1 is that the input data (Seq. A) is converted into a combination of bitonic sequences of length 4 (Seq. B). In stage S2, similar parallel CE operations are applied in opposite directions for adjacent bitonic sequences as shown and, in the case of an input data size greater than 8, subsequent stages would continue in a similar manner until a bitonic sequence of length N is generated. In this example, the result of stage S2 is that a bitonic sequence of length N=8 (Seq. C) is generated. In the last stage, stage S3 in this example, the bitonic sequence (Seq. C) is converted into a sorted sequence (Seq. D) as shown.

Figure 2:
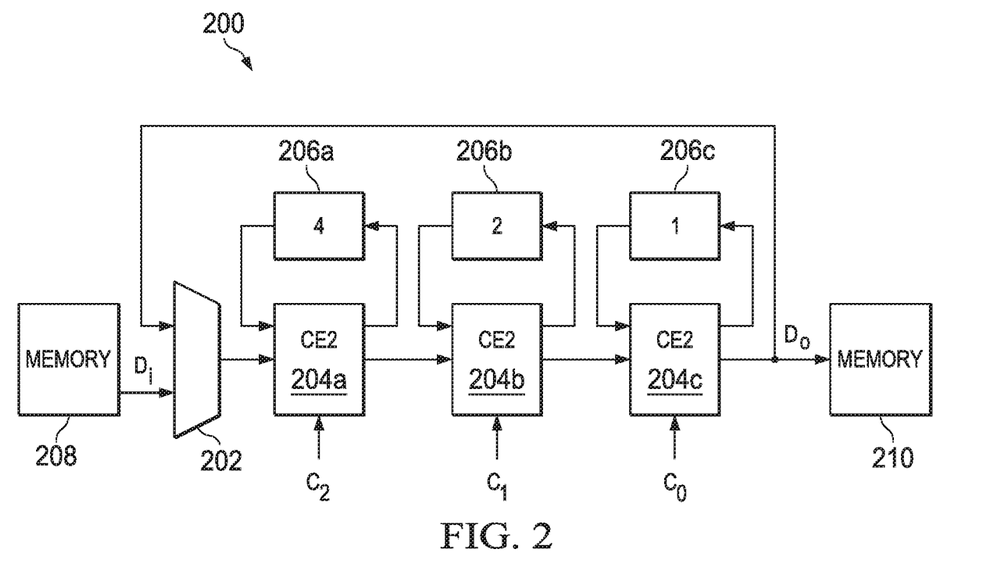
FIG. 2 shows a block diagram of a bitonic sorting accelerator in accordance with various examples.

FIG. 2 shows a bitonic sorting accelerator 200 in accordance with examples of the present disclosure. The bitonic sorting accelerator 200 receives input data (Di, which is an N-element vector of data values) from a memory 208 as an input to a two-input multiplexer (mux) 202. As explained above, the input data elements are received serially by the mux 202 of the bitonic sorting accelerator 200. The bitonic sorting accelerator 200 also includes one or more pipelined compare-exchange (CE) circuits 204. In the example of FIG. 2, the CE circuits 204 include a first CE circuit 204a and a last CE circuit 204c. For CE circuit 204b, the CE circuit 204a is referred to as a previous CE circuit 204a while the CE circuit 204c is referred to as a subsequent CE circuit 204c. In general, each CE circuit 204 between the first CE circuit 204a and the last CE circuit 204c has one previous and one subsequent CE circuit 204.

For a bitonic sorting accelerator 200 configured to sort input data of size N (assumed to be a power of 2 for generality), the bitonic sorting accelerator 200 includes at least $\log_2 N$ CE circuits 204. In an example where N is not a power of 2, zero padding is employed to increase the input data size to the next power of 2. In the example of FIG. 2, and for purposes of consistency with FIG. 1, for example, the input data is assumed to be of size N=8. Thus, in the example of FIG. 2, the bitonic sorting accelerator 200 includes three CE circuits 204a, 204b, 204c. The mux 202 includes two inputs, one coupled to memory 208 as explained above, and another coupled to output data (Do) generated by the last CE circuit 204c. The output data (Do) is also provided to memory 210, which is the same as memory 208 in some examples and separate from memory 208 in other examples.

Each CE circuit 204a, 204b, 204c is associated with a first-in, first-out (FIFO) buffer 206a, 206b, 206c, respectively. The FIFO buffers 206a, 206b, 206c serve as delay elements, and in some examples are implemented in memory or shift registers. For a bitonic sorting accelerator 200 having M CE circuits 204a, 204b, 204c where the M CE circuits can be indexed using M', where M' ranges from 0 to $\log_2 N-1$, the FIFO buffers 206a, 206b, 206c are of size $2^{\log_2 N-1-M'}$, or in this case sizes 4, 2, 1, respectively. The size of the FIFO buffer 206 associated with a particular CE circuit 204 specifies the "distance" of the comparison carried out by that particular CE circuit 204. Referring back to FIG. 1, for example, in stage S1 all of the comparisons are of adjacent values having a distance of 1; similarly, in stage S2, comparisons are of values having a distance of 2 and a distance of 1; finally, in stage S3, comparisons are of values having a distance of 4, then 2, then 1. Each CE circuit 204a, 204b, 204c also receives a control signal—$C_2$, $C_1$, $C_0$, respectively—which will be explained in further detail below.

Figure 3:
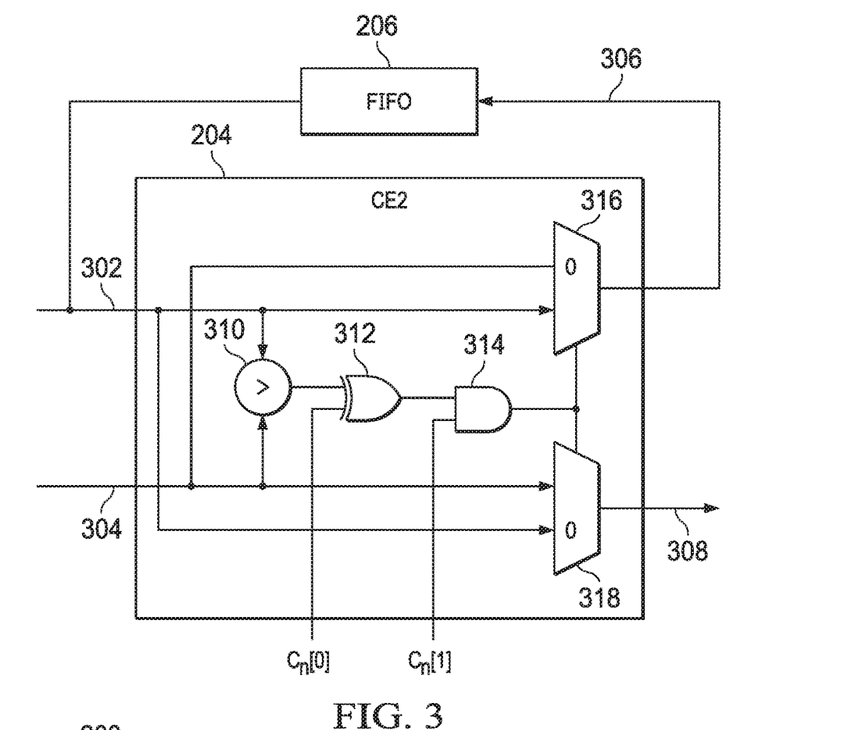
FIG. 3 shows a circuit schematic diagram of a compare-exchange circuit in accordance with various examples.

FIG. 3 shows a CE circuit 204 in greater detail. The CE circuit 204 includes a first input 302 that is coupled to an output of its associated FIFO buffer 206. For ease of reference, the output data of each FIFO buffer 206 may be referred to as a FIFO data value. The CE circuit 204 also includes a first output 306 that is coupled to an input of its associated FIFO buffer 206. The CE circuit 204 further includes a second input 304 and a second output 308. The second input 304 couples to a second output of a previous CE circuit 204 (e.g., as shown in FIG. 2) or memory (e.g., memory 208 by way of the mux 202 as shown in FIG. 2). The second output 308 couples to a second input of a subsequent CE circuit 204 (e.g., as shown in FIG. 2) or memory (e.g., memory 210 as shown in FIG. 2).

The CE circuit 204 also includes a comparator 310 that receives as inputs the first input 302 and the second input 304 and produces an output based on the comparison of the first input 302 and the second input 304. In the example of FIG. 3, the output of the comparator 310 is asserted (e.g., is a '1') when the first input 302 is greater than the second input 304 and is de-asserted (e.g., is a '0') when the first input 302 is less than the second input 304.

The CE circuit 204 receives a 2-bit control signal having its least- and most-significant bits notated as $C_n[0]$ and $C_n[1]$, respectively. The output of the comparator 310 and the least-significant bit $C_n[0]$ are provided as inputs to an XOR gate 312. The output of the XOR gate 312 and the most significant bit $C_n[1]$ are provided as inputs to an AND gate 314. The output of the AND gate 314 is a control for a first output mux 316 and a second output mux 318, the outputs of which include the first output 306 and the second output 308, respectively. In response to the output of the AND gate 314 being asserted, the first output mux 316 passes the first input 302 through as the first output 306 and the second output mux 318 passes the second input 304 through as the second output 308. In response to the output of the AND gate 314 being de-asserted, the first output mux 316 passes the second input 304 through as the first output 306 and the second output mux 318 passes the first input 302 through as the second output 308.

As a result of the above-described logic of the CE circuit 204, the compare-exchange operations are specified by the control signal $C_n$ as follows:

- 0 (or 1): in a first mode of operation, the compare-exchange operation is to bypass the CE circuit 204, which corresponds to a flow-through operation described in further detail below with respect to FIG. 4; data from the previous CE circuit (the second input 304) is stored into the FIFO buffer 206 (is the first output 306) and the oldest data from the FIFO buffer 206 (the first input 302) is passed to the next CE circuit (is the second output 308).
- 2: in a second mode of operation, the compare-exchange operation is to compare data from the previous CE circuit or memory 208 in the case of the first CE circuit 204a (the second input 304) with the FIFO data value, which is the oldest data from the FIFO buffer 206 (the first input 302); the larger data value is stored into the FIFO buffer 206 (is the first output 306) and the smaller data value is passed to the next CE circuit or memory 210 in the case of the last CE circuit 204c (is the second output 308).
- 3: in a third mode of operation, the compare-exchange operation is to compare data from the previous CE circuit or memory 208 in the case of the first CE circuit 204a (the second input 304) with the FIFO data value, which is the oldest data from the FIFO buffer 206 (the first input 302); the smaller data value is stored into the FIFO buffer 206 (is the first output 306) and the larger data value is passed to the next CE circuit or memory 210 in the case of the last CE circuit 204c (is the second output 308).

As will be explained further below, the difference in direction between a control signal of '2' versus a control signal of '3' allows for implementing the directionality of the arrows in FIG. 1.

Figure 4:
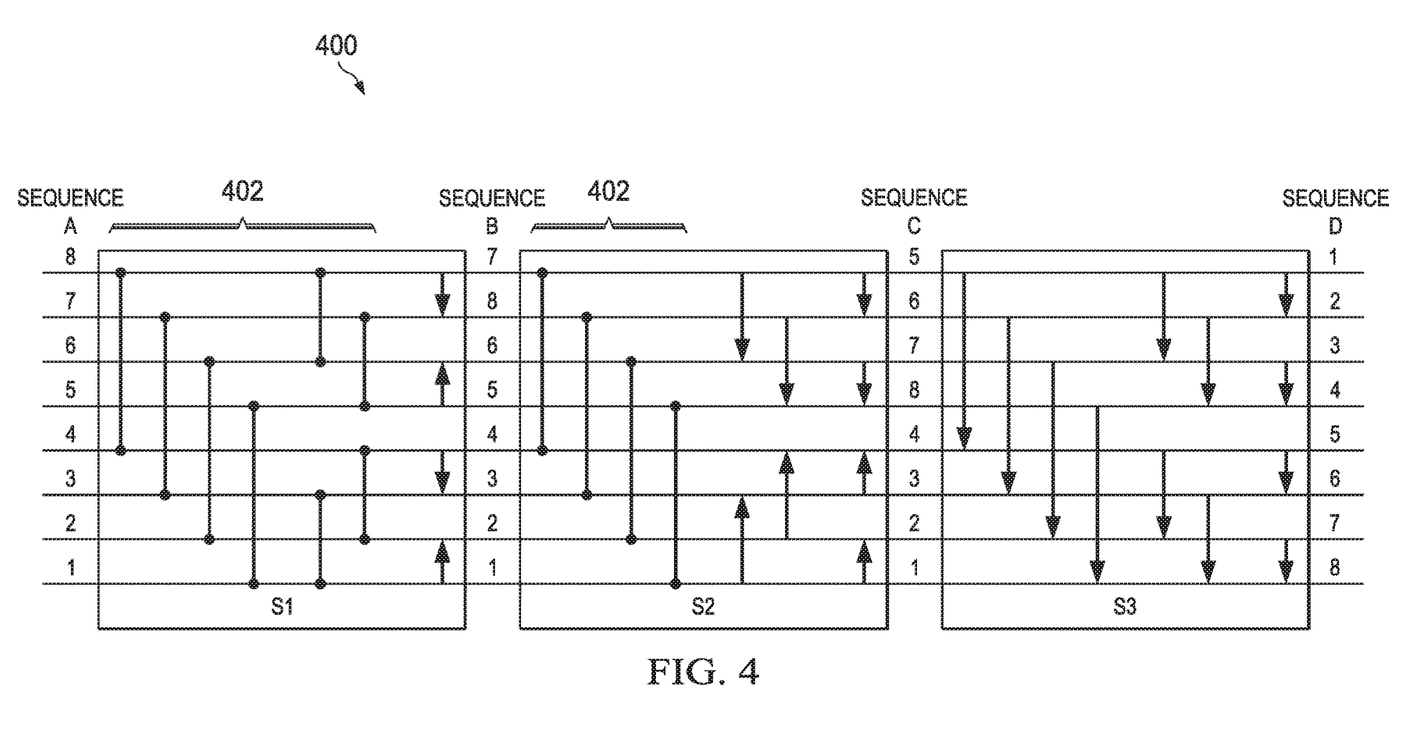
FIG. 4 shows a signal flow graph of a bitonic sorting network including flow-through operations in accordance with various examples.

FIG. 4 shows another example signal flow graph for bitonic sorting 400 that includes flow-through operations (e.g., corresponding to a control signal of 0, explained above). In particular, the exemplary signal flow graph 100 of FIG. 1 is shown including flow-through operations 402, shown as data elements at the ends of a dotted (not an arrow) connection. The flow-through operations are implemented, for example, to maintain a steady flow of data across the pipelined stages of the bitonic sorting engine 200. For example, in stage S1, the comparisons between elements having a distance of 4 and 2 are denoted as flow-through operations. Similarly, in stage S2, the comparisons between elements having a distance of 4 are denoted as flow-through operations. In stage S3, since a comparison of distance 4 is required (for carrying out the final bitonic sorting operation, as explained above with respect to FIG. 1), there are no flow-through operations for the particular example where N=8.

Figure 5:
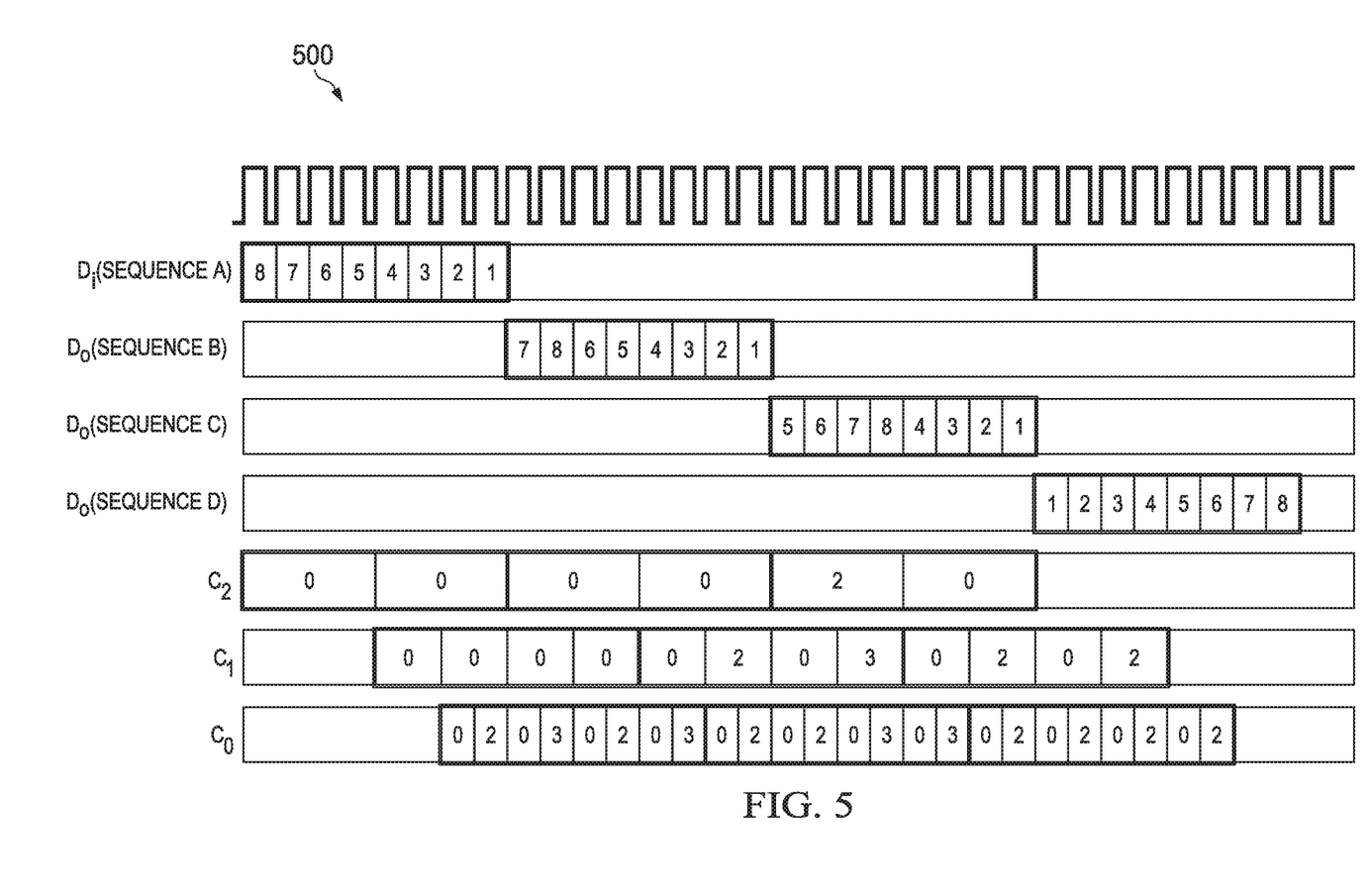
FIG. 5 shows a data flow and timing diagram for a bitonic sorting accelerator in accordance with various examples.

FIG. 5 shows an example data flow and timing diagram 500 for the input data (Di) and the output data (Do) of the bitonic sorting accelerator 200 for N=8 with an input pattern corresponding to Seq. A of FIGS. 1 and 4. Generally, the operation of the bitonic sorting accelerator 200 takes $N*\log_2 N$ clock cycles (in this case, 24 clock cycles) to complete from the time the last input data value ('1' in this example) is fed to the bitonic sorting accelerator 200.

Referring back to FIG. 2, the feedback connection from the output data Do to the input to the mux 202 allows the bitonic sorting accelerator 200 to be utilized iteratively (e.g., $\log_2 N$ times) to implement the stages S1, S2, S3 described above with respect to FIGS. 1 and 4. In the first iteration, which corresponds to stage S1, the CE circuit 204a (corresponding to a distance of 4) and the CE circuit 204b (corresponding to a distance of 2) are operated in flow-through mode, since stage S1 only performs compare-exchange operations on adjacent values having a distance of 1.

The compare-exchange operations for the CE circuit 204c (corresponding to a distance of 1) begin in the seventh clock cycle with a 0 to flow-through the first value ('8' in this example) to the associated FIFO buffer 206c. At this point in time, ordered from oldest to newest, the FIFO buffer 206a contains the values 5, 4, 3, 2; the FIFO buffer 206b contains the values 7, 6; and the FIFO buffer 206c contains the value 8.

In the eighth clock cycle, the compare-exchange operation for the CE circuit 204c is a 2, which causes the CE circuit 204c to compare data from the previous CE circuit 204b (the value 7, as the oldest data in FIFO buffer 206b and subject to a flow-through operation) to the oldest data from the FIFO buffer 206c (the value 8). The larger data value 8 is stored back to the FIFO buffer 206c while the smaller data value 7 is passed on as the output data Do, which is reflected as the first element of Do (Seq. B) in the timing diagram 500. Further, at this point, a control signal to the mux 202 is changed such that the output data Do serves as the input data to the CE circuit 204a to begin the second iteration to implement the following stage, stage S2 in this case.

In the ninth clock cycle, the compare-exchange operation for the CE circuit 204c is again 0 (flow-through), which causes the CE circuit 204c to pass on the data value 8 from its associated FIFO buffer 206c as the output data Do, which is reflected as the second element of Do (Seq. B) in the timing diagram 500. In the tenth clock cycle, the compare-exchange operation for the CE circuit 204c is a 3, which causes the CE circuit 204c to compared data from the previous CE circuit 204b (the value 5, as the oldest data in FIFO buffer 206b and subject to a flow-through operation) to the oldest data from the FIFO buffer 206c (the value 6). The smaller data value 5 is stored to the FIFO buffer 206c while the larger data value 6 is passed on as the output data Do, which is reflected as the third element of Do (Seq. B) in the timing diagram 500. The above-described process repeats to compare the data values 4 and 3 (using compare-exchange operation 2), and the data values 2 and 1 (using compare-exchange operation 3) to complete the stage S1 compare-exchange operations on adjacent values having a distance of 1.

Stage S2 is implemented in a manner similar to that described above with respect to stage S1, except that the control signals $C_n$ are modified to account for the change in directionality of the required compare-exchange operations. The remainder of the timing diagram 500 reflects the control signals $C_n$ and the output data Do corresponding to the result of stage S1 (Seq. B), the result of stage S2 (Seq. C) and the result of stage S3 (Seq. D).

Further, the control signals $C_n$ follow a pattern, which is generated for example using counter bits from a modulo-N binary counter (that counts from 0 to N−1) and a modulo-$\log_2$N binary counter (that counts from 0 to $\log_2$N−1) associated with each CE circuit 204a, 204b, 204c. The modulo-$\log_2$N binary counter increments every iteration and the modulo-N binary counter increments every clock cycle. Each of the CE circuits 204a, 204b, 204c are active (e.g., control signals $C_n$=2 or $C_n$=3) when the modulo-$\log_2$N binary counter reaches a particular value. For example for N=8, C2 is active when the modulo-$\log_2$N counter is equal to 2, C1 is active when the modulo-$\log_2$N counter is greater than or equal to 1, and C0 is active when the modulo-$\log_2$N counter is greater than or equal to 0. The value of $C_n$ is determined for each CE circuit 204a, 204b, 204c based on combinational logic using individual bits from the modulo-N counter. In other examples, the control signals $C_n$ are accessed from a control signal buffer in memory.

The bitonic sorting accelerator 200 shown in FIG. 2 and described above is serial in nature, in that the bitonic sorting accelerator 200 receives serial input data (Di) and generates output data (Do) serially, after a fixed latency. However, in some examples, a computer system on which a bitonic sorting accelerator is to be implemented includes a processor, bus fabric, and memory access (e.g., direct memory access (DMA)) that have a wider bandwidth, and thus are capable of handling a higher throughput. In such a computer system, overall system performance is reduced by a hardware accelerator that consumes and generates data relatively slowly, such as the serial input and serial output of the bitonic sorting accelerator 200.

Figure 6:
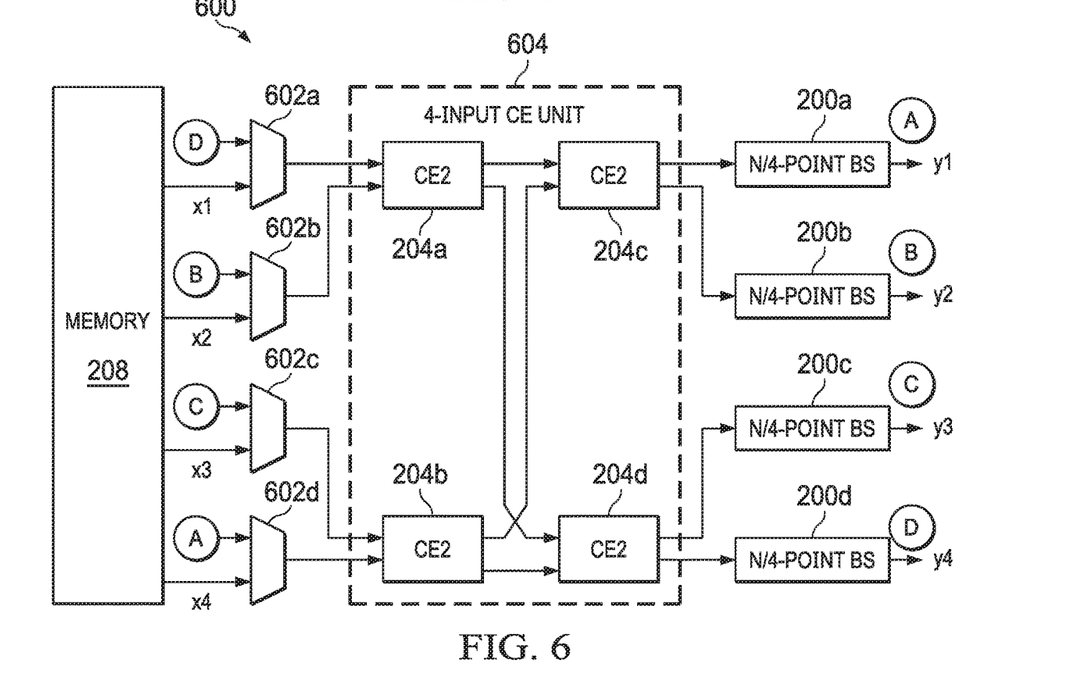
FIG. 6 shows a block diagram of a bitonic sorting accelerator with improved data parallelism in accordance with various examples.

FIG. 6 shows a bitonic sorting accelerator 600 with a high level of data parallelism, which reduces the number of clock cycles required to perform sorting on an N-element vector of data values. The bitonic sorting accelerator 600 receives input data from four parallel streams (notated as x1-x4) from the memory 208, with each stream being one input to a two-input multiplexer (mux) 602. As above with respect to FIG. 2, the input data elements are received serially by the muxes 602 of the bitonic sorting accelerator 600, but with 4x parallelism. The bitonic sorting accelerator 600 also includes a four-input CE circuit 604 that includes four CE circuits 204a-204d, which are identical to those shown in FIGS. 2 and 3 and described above.

The first CE circuit 204a includes a first input coupled to the output of the first mux 602a and a second input coupled to the output of the second mux 602b. The second CE circuit 204b includes a first input coupled to the output of the third mux 602c and a second input coupled to the output of the fourth mux 602d. The third CE circuit 204c includes a first input coupled to a first output of the first CE circuit 204a and a second input coupled to a first output of the second CE circuit 204b. The fourth CE circuit 204d includes a first input coupled to a second output of the first CE circuit 204a and a second input coupled to a second output of the second CE circuit 204b. As above, the CE circuits 204a-204d are configured to operate in a flow-through mode, where the first and second outputs correspond to the second and first inputs, respectively; in a compare mode in which the larger data value of the inputs is the first output and the smaller data value of the inputs is the second output; and in a compare mode in which the smaller data value of the inputs is the first output and the larger data value of the inputs is the second output.

The first and second outputs of the third and fourth CE circuits 204c, 204d are each coupled to an input of a bitonic sorting accelerator 200a-200d, respectively, described above in FIG. 2. The output of the first bitonic sorting accelerator 200a (y1) is coupled to an input of the mux 602d. The output of the second bitonic sorting accelerator 200b (y2) is coupled to an input of the mux 602b. The output of the third bitonic sorting accelerator 200c (y3) is coupled to an input of the mux 602c. The output of the fourth bitonic sorting accelerator 200d (y4) is coupled to the mux 602a.

Figure 7A:
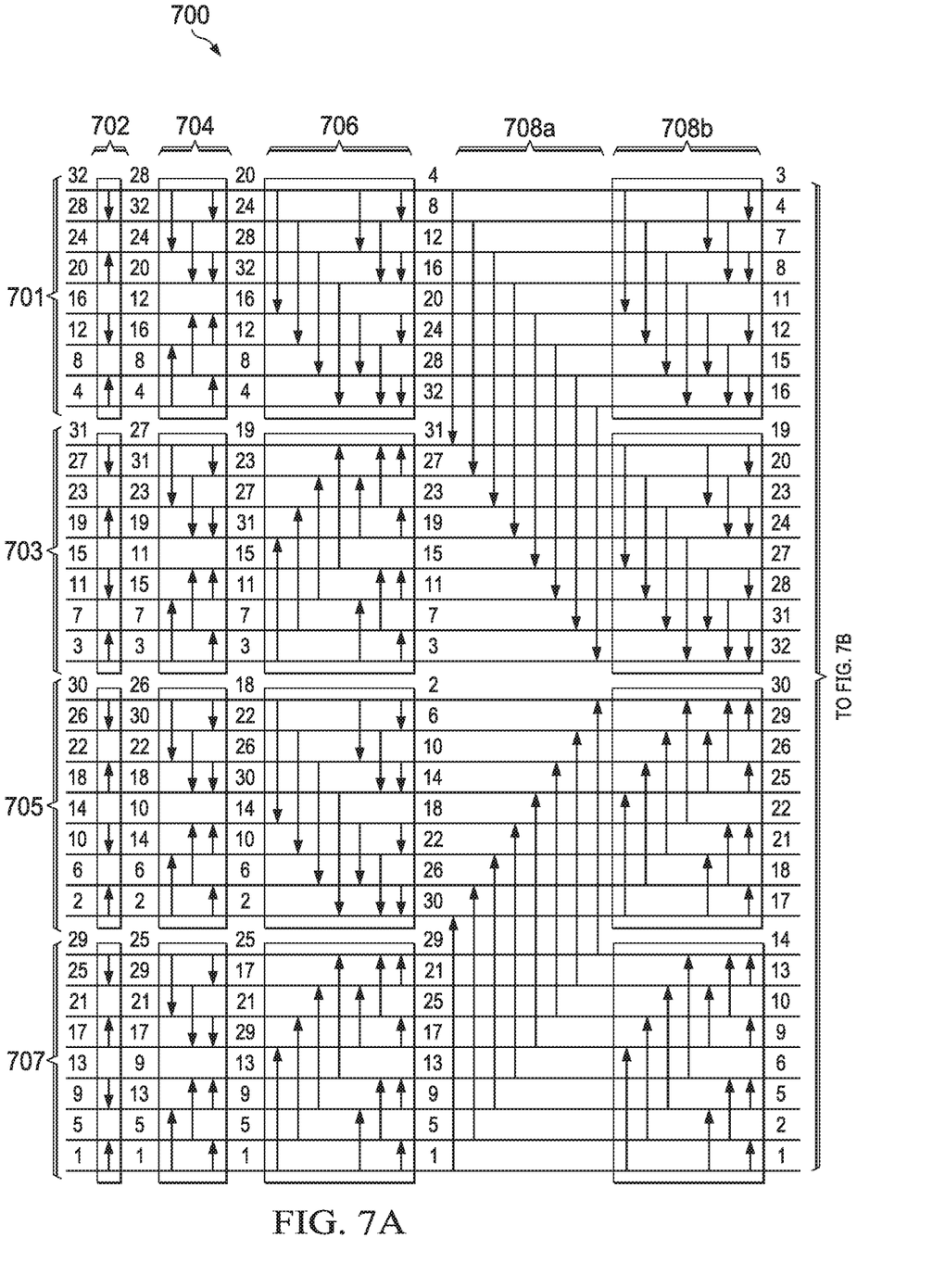
FIGS. 7A and 7B show a signal flow graph of a bitonic sorting network with improved data parallelism in accordance with various examples.
Figure 7B:
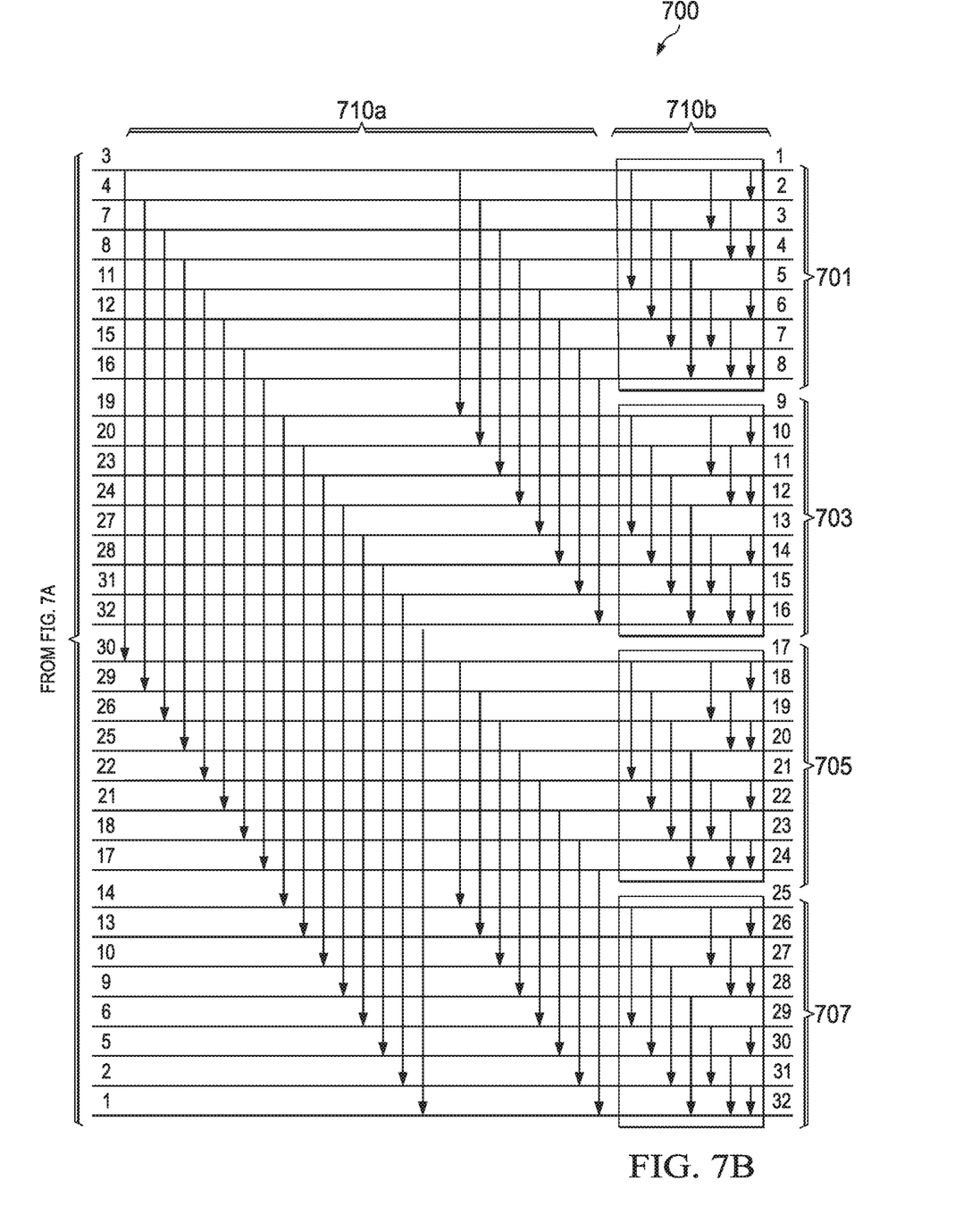

FIGS. 7A and 7B show an example signal flow graph for bitonic sorting 700 that does not include flow-through operations for simplicity. The example above with respect to the bitonic sorting accelerator 200 of FIG. 2 was for an 8-point bitonic sorting accelerator, although this disclosure can be extended to other numbers of points by adding additional CE circuits and associated FIFO buffers as explained. Thus, to continue the example of FIG. 2, the functionality of the bitonic sorting accelerator 600 is described as a 32-point bitonic sorting accelerator utilizing four 8-point bitonic sorting accelerators 200 as described above. In the signal flow graph 700, the rows 701, 703, 705, 707 correspond to functionality of the 8-point bitonic sorting accelerators 200a, 200b, 200c, 200d, respectively.

In the first stage 702, the CE circuits 204a-204d of the four-input CE circuit 604 are operated in flow-through mode, such that x1 input data is provided to the 8-point bitonic sorting accelerator 200d, x2 input data is provided to the 8-point bitonic sorting accelerator 200b, x3 input data is provided to the 8-point bitonic sorting accelerator 200c, and x4 input data is provided to the 8-point bitonic sorting accelerator 200a. In the first stage 702, the 8-point bitonic sorting accelerators 200a-200d implement flow-through operations for the comparisons between elements having a distance of 4 and 2, while elements having a distance of 1 are compared as explained above. In this case, only the final CE circuit of the 8-point bitonic sorting accelerators 200a-200d is not operated in a flow-through mode.

In the second and third stages 704, 706, the CE circuits 204a-204d of the four-input CE circuit 604 are again operated in flow-through mode, although after the 8 elements (in this example) are read from memory 208, the muxes 602a-602d are configured to provide the output of the 8-point bitonic sorting accelerators 200a-200d as input to the four-input CE circuit 604. In the second stage 704, the 8-point bitonic sorting accelerators 200a-200d implement flow-through operations for the comparisons between elements having a distance of 4, while elements having a distance of 2 and 1 are compared as explained above. In this case, only the last two CE circuits of the 8-point bitonic sorting accelerators 200a-200d are not operated in a flow-through mode. In the third stage 706, the 8-point bitonic sorting accelerators 200a-200d do not implement flow-through operations and elements having a distance of 4, 2, and 1 are compared as explained above.

In the fourth stage 708, the CE circuits 204c and 204d are operated in compare mode (corresponding to 708a) to carry out the comparisons between elements having a distance of 8. The 8-point bitonic sorting accelerators 200a-200d do not implement flow-through operations and elements having a distance of 4, 2, and 1 are compared (corresponding to 708b) as explained above. The CE circuits 204a and 204b are operated in flow-through mode.

Finally, in the fifth stage 710, the CE circuits 204a-204d are all operated in compare mode (corresponding to 710a) to carry out the comparisons between elements having distances of 16 and 8. The 8-point bitonic sorting accelerators 200a-200d do not implement flow-through operations and elements having a distance of 4, 2, and 1 are compared (corresponding to 710b) as explained above. No CE circuits 204a-204d or the CE circuits in the 8-point bitonic sorting accelerators 200a-200d implement flow-through operations. In this example, the fourth and fifth cycles are exemplary. In general, the four-input CE circuit 604 implements flow-through operations until the last two iterations or stages.

The bitonic sorting accelerator 600 improves throughput and latency relative to the bitonic sorting accelerator 200 described in FIG. 2. For example, for a data array of length N, the number of iterations remains $\log_2 N$. However, the clock cycles required for each iteration are reduced by a factor of 4 due to the parallelism introduced by the four-input CE circuit 604 and the N/4-point bitonic sorting accelerators (e.g., 8-point bitonic sorting accelerators 200a-200d in the example of FIG. 6). Thus, the latency of the bitonic sorting accelerator 600 is $((N*\log_2 N)/4)$ clock cycles with an effective throughput of $((\log_2 N)/4)$ clock cycles per sample.

Figure 8:
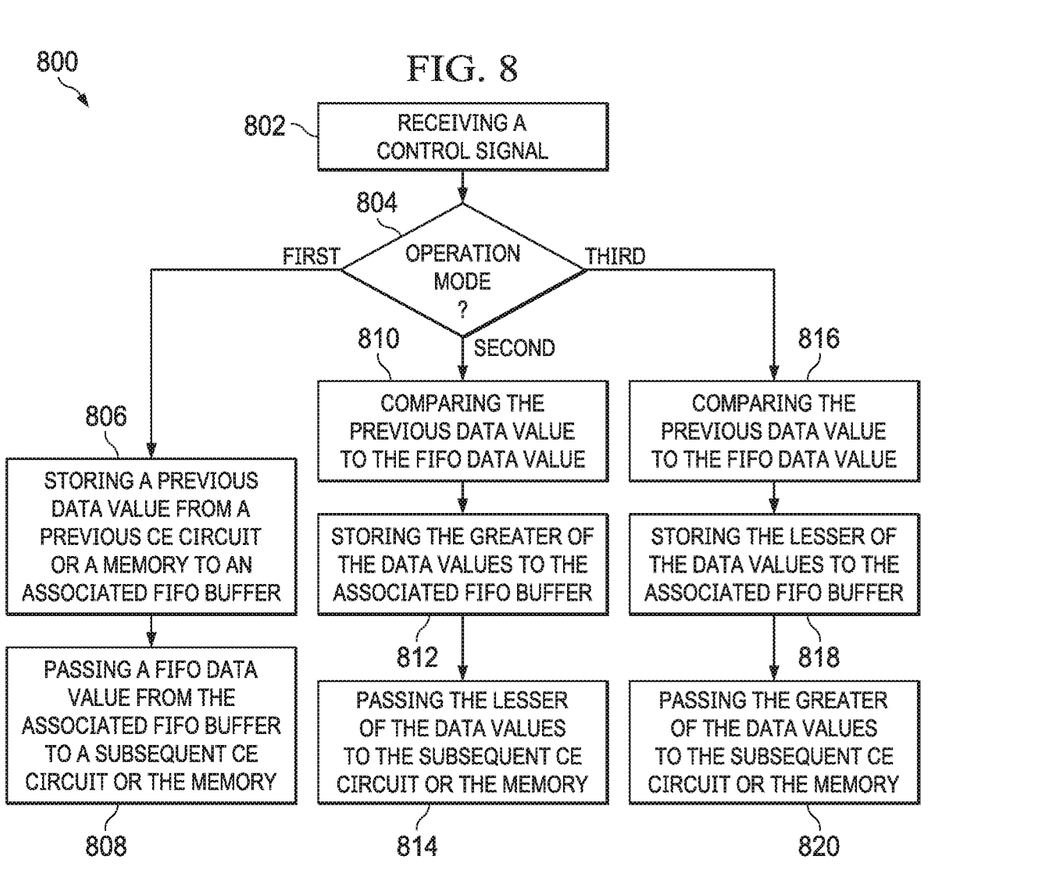
FIG. 8 shows a flow chart of a method for bitonic sorting in accordance with various examples.

FIG. 8 shows a flow chart of a method 800 in accordance with an example of the disclosure. The method 800 begins in block 802 with receiving a control signal, for example Cn as explained above with respect to FIG. 3. In block 804, the method 800 includes determining the operation mode for a compare-exchange circuit indicated by the control signal, which in one example is a first mode of operation if the control signal is a value of 0 or 1, is a second mode of operation if the control signal is a value of 2, and is a third mode of operation if the control signal is a value of 3.

If the control signal causes the compare-exchange circuit to operate in the first mode of operation, the method 800 progresses to block 806 with storing a previous data value from a previous compare-exchange circuit or a memory to an associated FIFO buffer. The output of the associated FIFO buffer is referred to as a FIFO data value. The method 800 then continues to block 808 with passing a FIFO data value from the associated FIFO buffer to a subsequent compare-exchange circuit or the memory.

If the control signal causes the compare-exchange circuit to operate in the second mode of operation, the method 800 progresses to block 810 with comparing the previous data value to the FIFO data value. The method 800 then continues in block 812 with storing the greater of the data values to the associated FIFO buffer, and in block 814 with passing the lesser of the data values to the subsequent compare-exchange circuit or the memory.

If the control signal causes the compare-exchange circuit to operate in the third mode of operation, the method 800 progresses to block 816 with comparing the previous data value to the FIFO data value. The method 800 then continues in block 818 with storing the lesser of the data values to the associated FIFO buffer, and in block 820 with passing the greater of the data values to the subsequent compare-exchange circuit or the memory.

As explained above, for example with respect to FIG. 5, the control signals are provided such that during a first iteration or set of iterations, an N-element vector of input data is arranged into a bitonic sequence by the plurality of compare-exchange circuits. Further, in a final iteration, the bitonic sequence is arranged into a fully-sorted array by the plurality of compare-exchange circuits. The control signals may be provided by a control signal buffer in memory, or provided using counter bits as explained above.

In the foregoing discussion and in the claims, reference is made to bitonic sorting accelerators including various elements, sections, and stages. It should be appreciated that these elements, sections, and stages, as the case may be, correspond to hardware circuitry, for example implemented on an integrated circuit (IC). Indeed, in at least one example, the entire bitonic sorting accelerator is implemented on an IC.

In the foregoing discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections. Similarly, a device that is coupled between a first component or location and a second component or location may be through a direct connection or through an indirect connection via other devices and connections. An element or feature that is "configured to" perform a task or function may be configured (e.g., programmed or structurally designed) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof. Additionally, uses of the phrases "ground" or similar in the foregoing discussion are intended to include a chassis ground, an Earth ground, a floating ground, a virtual ground, a digital ground, a common ground, and/or any other form of ground connection applicable to, or suitable for, the teachings of the present disclosure. Unless otherwise stated, "about," "approximately," or "substantially" preceding a value means+/−10 percent of the stated value.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

What is claimed is:

1. A hardware accelerator comprising:
    a compare-exchange circuit comprising a first input terminal, a second input terminal, a control terminal, a first output terminal, and a second output terminal; and
    a first-in, first-out (FIFO) buffer comprising:
        an input terminal coupled to the first terminal of the compare-exchange circuit; and
        an output terminal coupled to the first input terminal of the compare-exchange circuit; and
    wherein the compare-exchange circuit is configured to:
        receive a first data value at the first input terminal;
        receive a second data value at the second input terminal;
        receive a control signal at the control terminal;
        in response to determining that the control signal has a first value:
            output the first data value at the second output terminal; and output the second data value at the first output terminal;
in response to determining that the control signal has a second value:
output the greater of the first data value and the second data value at the first output terminal; and
output the lesser of the first data value and the second data value at the second output terminal; and
in response to determining that the control signal has a third value:
output the lesser of the first data value and the second data value at the first output terminal; and
output the greater of the first data value and the second data value at the second output terminal.

2. The hardware accelerator of claim 1, wherein the compare-exchange circuits is a first compare-exchange circuit, the hardware accelerator comprising:
a second compare-exchange circuit coupled to the second input terminal; and
a third compare-exchange circuit coupled to the second output terminal.

3. The hardware accelerator of claim 1, wherein the compare- exchange circuit is a first compare-exchange circuit, the hardware accelerator further comprising:
a second compare-exchange circuit comprising a first input terminal, a second input terminal, a control input terminal, a first output terminal, and a second output terminal;
memory; and
a multiplexer (mux) comprising:
a first input terminal coupled to the second output terminal of the second compare-exchange circuit;
a second input terminal coupled to the memory; and
an output terminal coupled to the first input terminal of the first compare-exchange circuit.

4. The hardware accelerator of claim 3, wherein the second output terminal of the second compare-exchange circuit is coupled to the memory.

5. The hardware accelerator of claim 3, wherein on a first iteration, the mux is configured to serially receive from the memory and provide to the second input terminal of the first compare-exchange circuit an N-element vector of data values.

6. The hardware accelerator of claim 5, wherein on a subsequent iteration, the mux is configured to couple the second output terminal of the last compare-exchange circuit to the second input of the first compare-exchange circuit.

7. The hardware accelerator of claim 6, further comprising a control signal buffer containing control signals that, when provided to the first compare-exchange circuit and the second compare-exchange circuit, cause the first compare-exchange circuit and the second compare-exchange-circuit to arrange the N-element vector into a bitonic sequence during a first iteration or set of iterations and into a fully-sorted array during a final iteration.

8. The hardware accelerator of claim 1, wherein the compare- exchange circuit is a first compare-exchange circuit, the hardware accelerator comprising:
memory coupled to the second input terminal; and
a second compare-exchange circuit coupled to the second output terminal.

9. The hardware accelerator of claim 1, wherein the compare-exchange circuit is a first compare exchange circuit, the hardware accelerator comprising:
a second compare-exchange circuit coupled to the second input terminal; and
memory coupled to the second output terminal.

10. A hardware accelerator comprising:
four multiplexers (muxes) each comprising an output terminal, a first input terminal adapted tobe coupled to a memory, and a second input terminal;
a compare-exchange circuit comprising four input terminals and four terminals, wherein the output terminal of each mux is coupled to one of the input terminals of the compare-exchange circuit; and
four sorting accelerators comprising a first sorting accelerator, a second sorting accelerator, a third sorting accelerator, and a fourth sorting accelerator, the four sorting accelerators each comprising an input terminal and an output terminal, wherein each output terminal of the compare-exchange circuit is coupled to one of the input terminals of the sorting accelerators,
wherein the output terminal of each sorting accelerator is coupled to the second input terminal of one of the muxes.

11. The hardware accelerator of claim 10, wherein the compare- exchange circuit further comprises:
first and second two-input compare-exchange circuits, each comprising first and second input terminals and first and second output terminals, wherein:
the first input terminal of the first two-input compare-exchange circuit is coupled to the output terminal of a first mux of the muxes;
the second input terminal of the first two-input compare-exchange circuit is coupled to the output terminal of a second mux;
the first input terminal of the second two-input compare-exchange circuit is coupled to the output terminal of a third mux of the muxes; and
the second input terminal of the second two-input compare-exchange circuit is coupled to the output terminal of a fourth mux of the muxes; and
third and fourth two-input compare-exchange circuits, each comprising first and second input terminals and first and second output terminals, wherein:
the first input terminal of the third two-input compare-exchange circuit is coupled to the first output terminal of the first two-input compare-exchange circuit;
the second input terminal of the third two-input compare-exchange circuit is coupled to the first output terminal of the second two-input compare-exchange circuit;
the first input terminal of the fourth two-input compare-exchange circuit is coupled to the second output terminal of the first two-input compare-exchange circuit; and
the second input terminal of the fourth two-input compare-exchange circuit is coupled to the second output terminal of the second two-input compare-exchange circuit;
wherein:
the first output terminal of the third two-input compare-exchange circuit is coupled to the input terminal of the first sorting accelerator;
the second output terminal of the third two-input compare-exchange circuit is coupled to the input terminal of the second sorting accelerator;
the first output terminal of the fourth two-input compare-exchange circuit is coupled to the input terminal of the third sorting accelerator; and
the second output terminal of the fourth two-input compare-exchange circuit is coupled to the input terminal of the fourth sorting accelerator.

12. The hardware accelerator of claim 10, wherein:
the output of the first sorting accelerator is coupled to the second input of a fourth mux of the muxes;
the output of the second sorting accelerator is coupled to the second input of a second mux of the muxes;
the output of the third sorting accelerator is coupled to the second input of a third mux of the muxes; and
the output of the fourth sorting accelerator is coupled to the second input of a first mux of the muxes.

13. The hardware accelerator of claim 10, wherein each sorting accelerator further comprises:
two-input compare-exchange circuits; and
a first-in, first-out (FIFO) buffer associated with each of the two-input compare exchange circuits, wherein an output terminal of each FIFO buffer is a FIFO data value;
wherein the two-input compare-exchange circuits are configured to:
in a first mode of operation, store a previous data value from a previous two-input compare-exchange circuit or the compare-exchange circuit to its associated FIFO buffer and pass a FIFO data value from its associated FIFO buffer to a subsequent two-input compare-exchange circuit, one of the muxes, or the memory;
in a second mode of operation, compare the previous data value to the FIFO data value, store the greater of the data values to its associated FIFO buffer, and pass the lesser of the data values to the subsequent two-input compare-exchange circuit, one of the muxes, or the memory; and
in a third mode of operation, compare the previous data value to the FIFO data value, store the lesser of the data values to its associated FIFO buffer, and pass the greater of the data values to the subsequent two-input compare-exchange circuit, one of the muxes, or the memory.

14. The hardware accelerator of claim 13, wherein each of the two- input compare-exchange circuits comprises:
a first input terminal coupled to an output terminal of its associated FIFO buffer;
a first output terminal coupled to an input terminal of its associated FIFO buffer;
a second input terminal coupled to a second output terminal of the previous two-input compare-exchange circuit or an output terminal of the compare-exchange circuit; and
a second output terminal coupled to the second input terminal of a subsequent two-input compare-exchange circuit, one of the muxes, or the memory.

15. The hardware accelerator of claim 13, wherein:
each of the two-input compare-exchange circuits is configured to receive a control signal; and
the received control signal causes the two-input compare-exchange circuit to operate in one of the first, second, and third modes of operation.

16. The hardware accelerator of claim 13, wherein on a first iteration, each of the muxes is configured to serially receive from the memory and provide to the input terminal of the compare-exchange circuit a N/4-element vector of data values.

17. The hardware accelerator of claim 16, wherein on a subsequent iteration, each of the muxes is configured to couple one of the output terminals of the sorting accelerators to one of the input terminals of the compare-exchange circuit.

18. The hardware accelerator of claim 16, further comprising a control signal buffer continuing control signals that, when provided to the compare-exchange circuit and the two-input compare-exchange circuits of the sorting accelerators, cause the hardware accelerator to arrange the four N/4-element vectors into a bitonic sequence during a first iteration or set of iterations and into a fully-sorted array during a final iteration.

19. A method comprising:
receiving, by a compare-exchange circuit, a control signal at a control terminal;
receiving, by the compare-exchange circuit, a first data value at a first input terminal;
receiving, by the compare-exchange circuit, a second data value at a second input terminal;
in response to determining that the control signal has a first value:
outputting, by the compare-exchange circuit, the first data value at a first output terminal; and
outputting, by the compare-exchange circuit, the second data value at a second output terminal;
in response to determining that the control signal has a second value:
outputting, by the compare-exchange circuit, the greater of the first data value and the second data value at the first output terminal; and
outputting, by the compare-exchange circuit, the lesser of the first data value and the second data value at the second output terminal; and
in response to determining that the control signal has a third value:
outputting, by the compare-exchange circuit, the lesser of the first data value and the second data value at the first output terminal; and
outputting, by the compare-exchange circuit, the greater of the first data value and the second data value at the second output terminal.

20. The method of claim 19, further comprising providing control signals to compare-exchange circuits comprising the compare-exchange circuit, instructing the compare-exchange circuits to arrange an N-element vector into a bitonic sequence during a first iteration or set of iterations and into a fully-sorted array during a final iteration.

* * * * *